United States Patent Office 3,412,168
Patented Nov. 19, 1968

3,412,168
METHOD OF RECOVERING MONO-METHYLNAPHTHALENES
Philip X. Masciantonio, Penn Township, Westmoreland County, and Francis P. Mullooly, Masontown, Pa., assignors to United States Steel Corporation, a corporation of Delaware
No Drawing. Filed Oct. 22, 1965, Ser. No. 502,531
3 Claims. (Cl. 260—674)

This invention relates to a method of recovering a monomethylnaphthalenes fraction of high purity from a fraction having a nominal boiling range between about 230° and 270° C.

Applications for monomethylnaphthalenes are well known in areas such as lubricants, functional fluids, plastics, dyes, pharmaceuticals, pesticides and chemical intermediates. To be suitable for these applications the product should be colorless, free of objectionable odors, stable to heat and light and also suitable for such chemical reactions as sulfonation, oxidation and halogenations. In the following specification and claims the term "high-purity" designates such a product.

Our invention relates to a recovery of a high-purity monomethylnaphthalenes product from a crude fraction containing the same. The recovery is effected by a sequence of liquid phase extractions with sulfuric acid, caustic solution and water, employing solutions of specified strength and conducted in a special, critical order, followed by distillation. The method requires only liquid-phase extraction equipment and distillation equipment of relatively moderate fractionating power.

According to our method of coal-tar fraction, for example, comprising the usual, commercial methylnaphthalenes cut having a nominal boiling range between about 230° and 270° C. is treated sequentially with relatively dilute sulfuric acid and then with concentrated sulfuric acid. It is then treated with aqueous caustic solution and then with water. It is then fractioned to recover as a high-purity product a fraction distilling between about 235° and 247° C. A similar high-purity product is recovered when a crude fraction has a narrower boiling range between about 230° and 250° C.

In the first extraction step the sulfuric acid should preferably have a concentration between about 10% and 50%. Below about 10% the increasing volume of water requires the handling of more materials. As the concentration is gradually increased above about 50%, the desirable, easily separable friable resin of the next step will be attained with increasing difficulty. The treating period should preferably be between about 3 to 30 minutes depending on the type extractor employed. Since an important object of this step is to remove most of the tar bases, a preferred mole ratio of acid to bases should be between about 0.5 and 2.0 moles acid to 1 mole of bases. The preferred treating temperature is in a range between about 10° and 80° C. Undesirable sulfonation and loss of product occurs when the temperature is increased much above 80° C. especially if the acid concentration is on the high side of its range. After the described treatment the material, on standing, settles into two layers. They may be separated as an acid layer and a tar-fraction layer.

In the second extraction step the separated tar-fraction layer is treated with sulfuric acid, preferably having a concentration between about 90% and 100%, to remove polymerizable material from the fraction as a friable, easily separated resin. As a concentration is gradually decreased below about 90% to about 80%, the resin becomes gradually less friable and more gelatinous, making subsequent separation by filtering or centrifuging more difficult. The treating period should preferably be between about 3 to 30 minutes. The quantity by weight of acid used should be at least about 3% by weight of the tar fraction to effect the preferred removal of polymerizable material. Above about 12% by weight acid, the loss by sulfonation becomes excessive. The treating temperature should be in the range between about 150° and 190° C. Below about 150° C., the friable resin will not form. Above about 190° C. vaporization of the fraction becomes excessive. Generally, with acid quantity, concentration and treating temperatures on the high side of their respective ranges, the treating period should be on the low side of this range and vice versa. After the described treatment, resin and tar fraction may be separated by filtration or by centrifuging.

In the third extraction step the tar fraction is treated preferably with aqueous caustic soda having a concentration between about 10% and 50% to neutralize residual sulfuric acid and to extract tar acids. Below about 10% the increasing volume of water requires the handling of more materials. Above about 50% concentration the caustic dissolves valuable product and may cause separation problems because of emulsion formation. The preferred quantity of caustic is between about 10% and 20% by weight of the tar fraction. The concentration and quantity of caustic should preferably be supplied to provide sufficient water solution to permit separation into a caustic and a tar fraction layer and to maintain the extraction mixture at a pH greater than 7.0. The treatment may be effected in a range between about 10° and 80° C. for about 5 to 30 minutes. The treating temperature degree of agitation and contact time do not have critical limits, however. Although sodium hydroxide is preferred, other strong caustic solutions may be used, for example, the hydroxides of potassium, calcium, and barium. After the described treatment, the material, on standing, settles into two layers that may be easily separated.

In the fourth extraction step the separated tar-fraction layer is treated with a quantity of water that preferably represents about 10% of the volume of the tar fraction. This quantity of water should be sufficient for good phase separation and to remove the soluble caustic sulfonates formed in the prior step from the methylnaphthalene sulfonic acids formed in the acid extraction steps. Removal of these sulfonates is critical since in the subsequent distillation step they decompose and make the produce malodorous. The extraction temperature should be in a range to maintain the water as a liquid. The degree of agitation and contact time should be sufficient to attain good contact between the phases. After the described treatment, the material, on standing, settles into two layers that may be easily separated.

In the fifth step the separated tar-fraction layer is distilled in a fractionating column constructed with a sufficient number of separation stages to permit collection of a distillate comprising monomethylnaphthalenes fraction having a boiling range between about 235° and 247° C. and comprising at least about 90% monomethylnaphthalenes. The column may be operated at a pressure in the range of 10 to 760 millimeters of mercury absolute (mm. of Hg abs.). To recover a high-purity product comprising at least about 95% monomethylnaphthalenes from a 230°–270° C. starting fraction, a preferred operation may be conducted in a 30-stage fractionating column at a pressure of 760 mm. Hg abs. Fewer stages may be used with a 230°–250° C. starting fraction.

Specific examples of the practice of our invention are set forth below.

Example 1

In a flask provided with a stirrer 100 parts by weight of a coal-tar fraction having a nominal boiling range between 230° and 270° C. was washed for 30 minutes with 28 parts by weight of 30% sulfuric acid at 50° C. This provided a mole ratio of acid to tar bases in the fraction of 1:1. After gravity separation, 100 parts by weight of the fraction were washed for 15 minutes with 10 parts by weight of 96% sulfuric acid at 180° C. A small quantity of resin was formed which was easily separated from the fraction by filtration. Thereafter, 100 parts by weight of the fraction were washed for 10 minutes with 15 parts by weight of a 25% aqueous sodium hydroxide solution at 50° C. The fraction was decanted and 100 parts by volume of the fraction were washed with 10 parts by volume of water for 5 minutes at 35° C. The decanted fraction was distilled in a 30-tray fractionating column at atmospheric pressure and a distillate fraction was collected as product at a head temperature of 235° to 247° C. By gas chromatography the high-purity product was 95% monomethylnaphthalenes comprising 59% 2-methylnaphthalene and 36% 1-methylnaphthalene.

Examples 2 and 3

In Example 2 the procedure described in Example 1 was repeated, except that the coal-tar fraction had a nominal boiling range between 230° and 250° C. In Example 3 the procedure of Example 2 was followed, except that the fractionating column was operated at 50 mm. Hg abs. and the distillate was collected at a head temperature of 142° to 154° C. The high-purity products of Examples 2 and 3 were substantially the same as the product obtained in

Example 1

The above examples illustrate our preferred procedure and the high-purity products obtainable thereby. Where the procedure of Example 1 was followed partially, by washing a 230° to 270° C. coal-tar fraction with 30% sulfuric acid at 50° C. using an acid to tar bases mole ratio of 1:1 but immediately distilling the separated fraction as described in Example 1, the product was not a high-purity product. It was amber colored, had a sulfurous odor, had a dark fluorescence, formed a resinous gel with hydrochloric acid, darkened on standing in light or on heating and could not be oxidized to useful derivatives. By gas chromatography the product was 90% monomethylnaphthalenes comprising 55% 2-methylnaphthalene and 35% 1-methylnaphthalene. Where the same procedure was followed except that between dilute acid washing and ditsillation, the fraction was washed successively with 10% by weight aqueous sodium hydroxide solution and water, the product was substantially the same as hereinabove described. Where the Example 1 procedure was followed except that the sodium hydroxide and water washing steps were omitted, the product was colorless but had a sulfurous odor. It darkened on heating or when exposed to sunlight and could not be oxidized to useful derivatives.

It is evident therefore that, to obtain high-purity monomethylnaphthalenes, our described sequence of liquid-phase extractions with sulfuric acid, caustic solution and water, with distillation must be followed. Solutions of specified strength and the other described conditions are required.

While the above examples illustrate our preferred procedure changes therein may be made without departing from the spirit of the invention. It will be apparent that for commercial preparation of our products, the hereinabove described equipment may be of any design known to effect the desired results. While coal-tar fractions having nominal boiling ranges wtihin the limits 230°–250° C. and 230°–270° C. are preferred sources for our high-purity products, such fractions may be derived from other sources, for example, gas-oil fractions from petroleum refining and drain oils from coal-tar processing. The boiling ranges of all fractions included in the specification and appended claims are nominal boiling ranges.

Although we have disclosed herein the practice of our invention, we intend to cover as well any changes or modifications therein which may be made without departing from the spirit and scope of the invention.

We claim:

1. A method of recovering a high-purity monomethylnaphthalenes fraction from a fraction having a nominal boiling range of 230°–270° C. comprising treating said fraction at a temperature between 10° and 80° C. with sulfuric acid having a concentration between about 10% and 50%, the mole ratio of acid to bases in said fraction being between about 0.5 and 2.0 of acid to 1 of bases, separating said fraction from an acid layer, treating said fraction at a temperature between about 150° and 190° C. with at least about 3% by weight of said fraction of sulfuric acid having a concentration between about 90% and 100% until a friable resin is formed, filtering to separate said fraction and resin, treating said fraction with about 10% to 20% by weight of a 10% to 50% aqueous caustic solution, separating said fraction from a caustic layer, treating said fraction with a volume of water at least about 10% of the volume of said fraction, separating said fraction from a water layer, fractionating said fraction and collecting a distillate comprising a said monomethylnaphthalenes fraction having a boiling range of 235° to 247° C.

2. A method of recovering a high-purity monomethylnaphthalenes fraction of about 95% purity from a coke-oven tar fraction having a nominal boiling range of 230°–270° C. comprising treating said tar fraction at a temperature of about 50° C. with sulfuric acid having a concentration of about 30%, the mole ratio of acid to bases being about 1:1, separating said fraction from an acid layer, treating said fraction at a temperature of about 180° C. with about 5% by weight of said fraction of sulfuric acid having a concentration of about 96% until a friable resin is formed, centrifuging to separate said fraction and resin, treating said fraction with about 15% by weight of a 25% aqueous caustic soda solution, separating said fraction from a caustic layer, treating said fraction with a volume of water of about 10% of the volume of said fraction, separating said fraction from a water layer, fractionating said fraction and collecting a distillate comprising a said monomethylnaphthalenes fraction having a boiling range of 235° to 247° C.

3. A method as defined in claim 2 characterized by said tar fraction having a nominal boiling range of 230°–250° C.

References Cited

UNITED STATES PATENTS

| | | | |
|---|---|---|---|
| 2,920,121 | 1/1960 | Sisco et al. | 260—674 |
| 3,116,341 | 12/1963 | Sheppard et al. | 260—674 |

DELBERT E. GANTZ, *Primary Examiner.*

C. E. SPRESSER, *Assistant Examiner.*